United States Patent [19]

DeLong et al.

[11] Patent Number: 4,881,195

[45] Date of Patent: Nov. 14, 1989

[54] MULTI-REQUESTER ARBITRATION CIRCUIT

[75] Inventors: Steven T. DeLong, Bartlett, Ill.; James E. Snook, Plano, Tex.

[73] Assignee: Rockwell International Corp., El Segundo, Calif.

[21] Appl. No.: 935,421

[22] Filed: Nov. 26, 1986

[51] Int. Cl.[4] ......................... G06F 9/46; G06F 13/18
[52] U.S. Cl. ..................................... 364/900
[58] Field of Search ... 364/200 MS File, 900 MS File

[56] References Cited

U.S. PATENT DOCUMENTS

| | | | |
|---|---|---|---|
| 4,402,040 | 8/1983 | Evett | 364/200 |
| 4,453,214 | 6/1984 | Adcock | 364/200 |
| 4,493,022 | 1/1985 | Nicolas et al. | 364/200 |
| 4,533,994 | 8/1985 | Harrill et al. | 364/200 |
| 4,535,330 | 8/1985 | Carey et al. | 364/900 |
| 4,546,450 | 10/1985 | Kanuma | 364/900 |
| 4,583,160 | 4/1986 | Iguma | 364/200 |
| 4,586,128 | 4/1986 | DeWoskin | 364/200 |
| 4,597,054 | 6/1986 | Lockwood et al. | 364/900 |
| 4,598,362 | 6/1986 | Kinjo et al. | 364/200 |
| 4,609,995 | 9/1986 | Hasebe | 364/900 |
| 4,611,297 | 9/1986 | Dudley et al. | 364/900 |
| 4,621,342 | 11/1986 | Capizzi et al. | 364/900 |
| 4,627,018 | 12/1986 | Trost et al. | 364/900 |
| 4,630,197 | 12/1986 | Khera | 364/200 |
| 4,639,859 | 1/1987 | Ott | 364/900 |
| 4,641,266 | 2/1987 | Walsh | 364/200 |
| 4,649,471 | 3/1987 | Briggs et al. | 364/200 |
| 4,722,072 | 1/1988 | Price | 364/200 |
| 4,724,519 | 2/1988 | Barlow et al. | 364/200 |

Primary Examiner—Andrew J. James
Assistant Examiner—Viet Nguyen
Attorney, Agent, or Firm—C. B. Patti; V. L. Sewell; H. F. Hamann

[57] ABSTRACT

A multi-requester arbitration circuit receives multiple asynchronous request signals and provides a first common timing signal from the request signals. A sample-and-hold circuit receives each of the request signals and produces corresponding output sample signals. The sample-and-hold circuit receives the first common timing signals. A time delay circuit produces a second timing signal from the first common timing signal. A storage circuit receives the output sample signals and produces corresponding output stored signals. The storage circuit receives the second timing signal. An arbitration circuit receives the output stored signals to select one of the request signals and provide at least an output control signal indicative thereof. The sample-and-hold circuit samples each of the request signals before the first common timing signals causes the sample-and-hold circuit to hold all request signals. Each of the output sample signals is received by the storage circuit before the second timing signal causes the storage circuit to retain the output storage signals for use by the arbitration circuit.

7 Claims, 2 Drawing Sheets

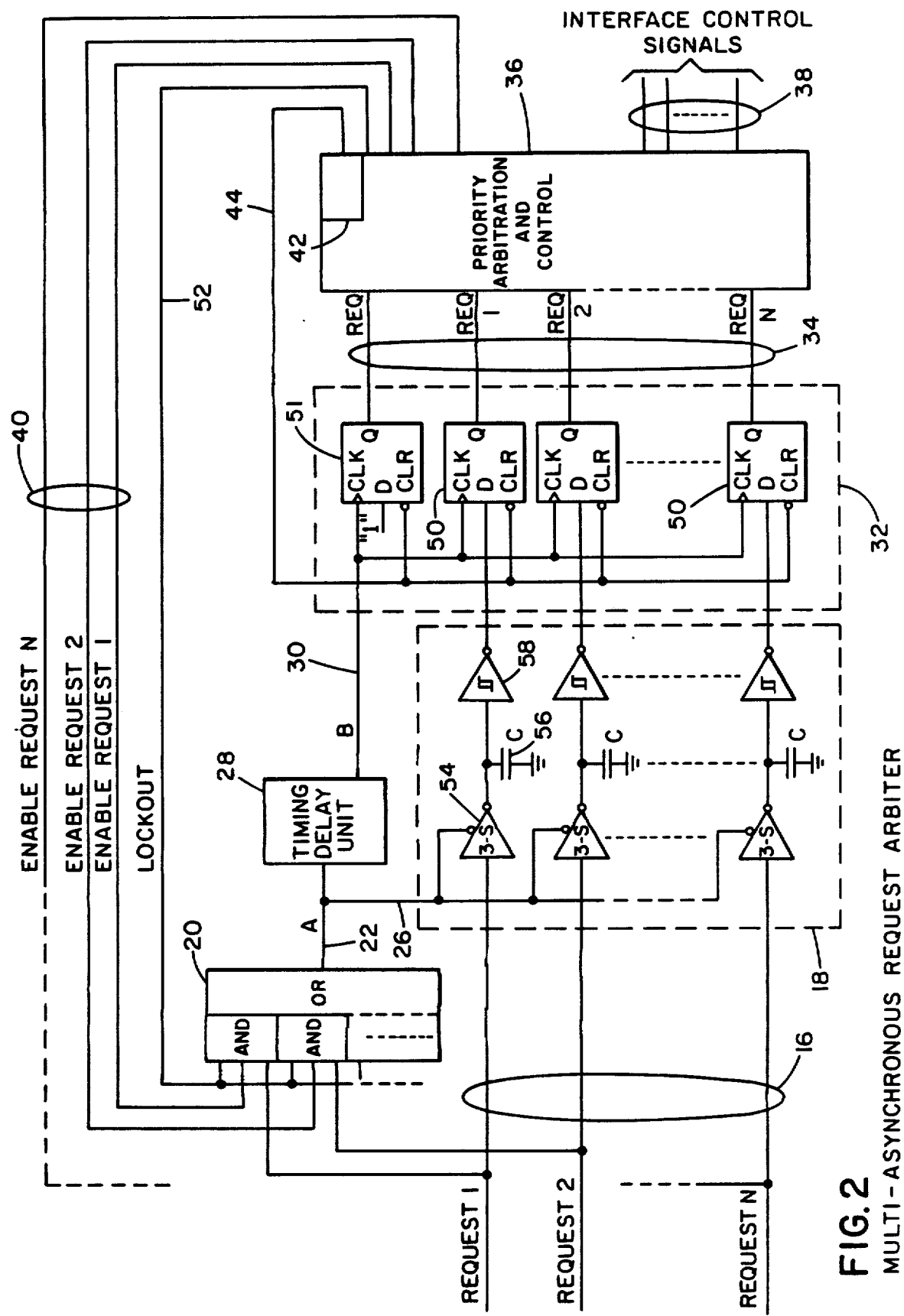
FIG.2 MULTI-ASYNCHRONOUS REQUEST ARBITER

MULTI-REQUESTER ARBITRATION CIRCUIT

BACKGROUND OF THE INVENTION

This invention relates in general to multi-requester arbitration circuits for arbitrating between multiple request signals, and in particular, for arbitrating between multiple asynchronous request signals.

In present digital electronics systems, especially those which are computer based, there is often a need to provide arbitration between more than one requester which needs service from a general system resource. For example, a typical prior art system can have two or more computer processors which must share a common system bus or a common system memory. Computer processors are hereinafter referred to as "requesters of service," and the bus, memory, or other device is hereinafter referred to as "a general system resource." It is common that requests from the computer processors do not occur simultaneously in time, but rather occur asynchronously.

One prior art arbitration technique is to synchronize the asynchronous requests to a free running clock. A request is clocked into a first rank flip-flop, which is then clocked into a second rank flip-flop. Several drawbacks exist for this method. Since the output of the first flip-flop can go metastable, the clock period must be much greater than the propagation delay through the first flip-flop. If this is not provided, then the metastability at the output of the first flip-flop could be transferred into the second flip-flop. However, the settling of any metastability cannot be guaranteed to be stable within any given time period. Rather, the first flip-flop would be stable within some time period for some statistical probability of clocked events. Thus, synchronization is relatively slow and is not guaranteed correct every time.

Another prior art synchronization technique is to clock a request into three ranks of flip-flops, and provide a voting technique to determine if arbitration decisions are accurate. However, there is still a statistical probability of an arbitration error occurring.

OBJECT OF THE INVENTION

It is a general object of the present invention to provide a novel multi-requester arbitration circuit which guarantees correct arbitration.

It is a more specific object of the present invention to provide a multi-requester arbitration circuit which is not limited by statistical probabilities of success due to elimination of metastability conditions.

It is another object of the present invention to provide an arbitration process which is performed within three to five times that of the progagation delay arbitration technique.

It is a further object that the number of asynchronous requests is not limited by the arbiter or arbitration technique, but rather by project cost, space, chosen technology, etc.

It is also an object that the arbiter can be implemented in several technologies.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

FIG. 2 is a more specific block diagram of the FIG. 1 block diagram.

DESCRIPTION OF THE PREFERRED EMBODIMENT

Figure 1:
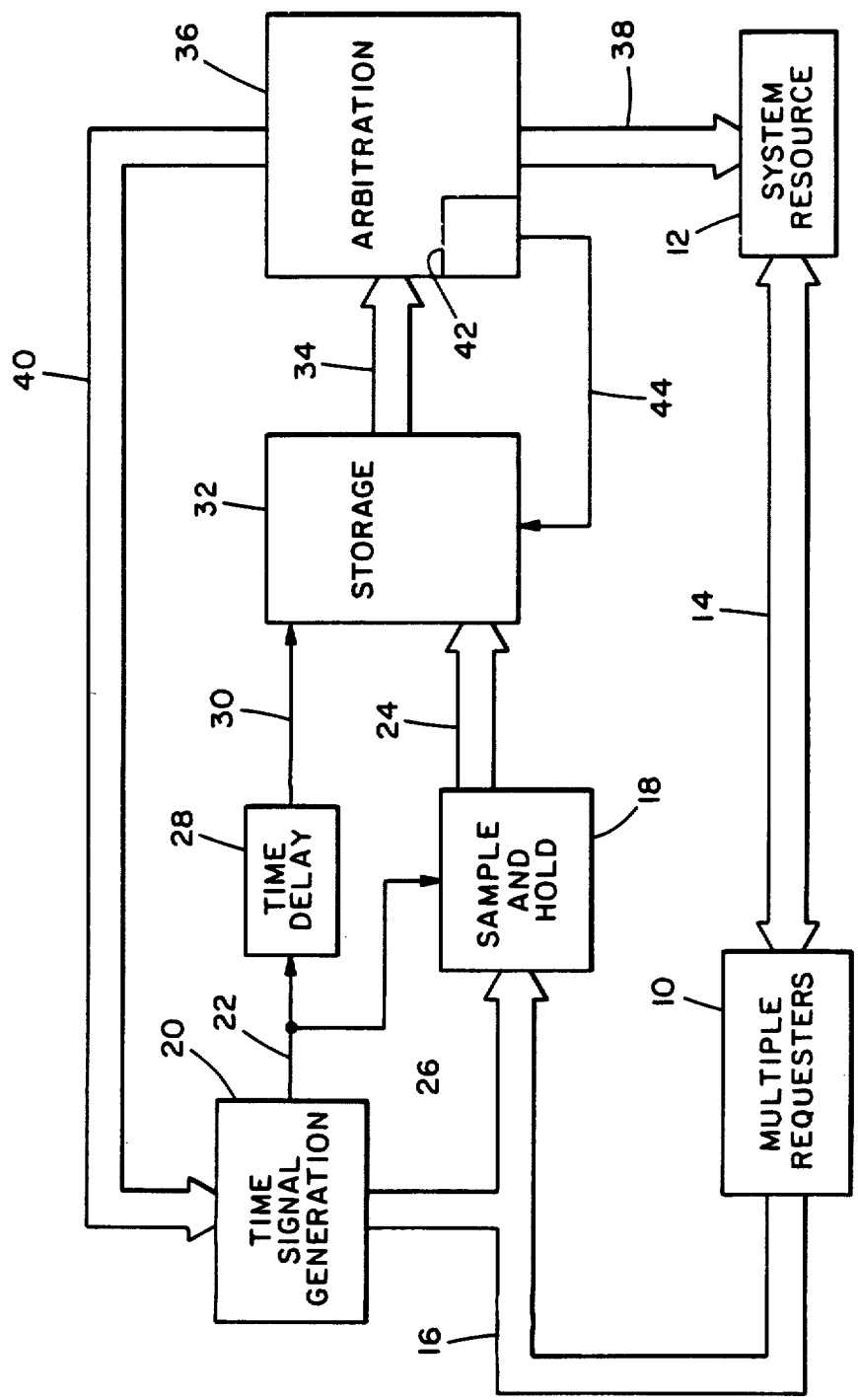
FIG. 1 is a general block diagram of the novel multi-requester arbitration circuit.

This invention pertains to a novel multi-requester arbitration circuit for arbitrating between multiple asynchronous request signals. The circuit is utilized in digital electronic environments wherein two or more computer processors or other similar type requesters share a common system resource, such as a common bus or a common memory. In a digital electronic environment this invention provides guaranteed, fast arbitration between the multiple asynchronous requests which require access to the common system resource. In addition, it avoids the metastability problem associated with this type of arbitration. It also provides a guaranteed manner of handling the contention for the common system resource which arises in a multi-requester system.

As shown in FIG. 1, the multi-requesters 10 are connected to the common system resource 12 by bus 14. The multi-requesters 10 provide a set of asynchronous request signals on bus 16. The request signals are received by sample-and-hold circuit 18, and also by time signal generation circuit 20 which may be an AND/OR invert gate. The time signal generation circuit 20 is a means for providing a first common timing signal from the request signals. The first common timing signal appears on line 22. The sample-and-hold circuit 18 is a means for performing sample and hold on each of the request signals and produces corresponding output sample signals on bus 24. The sample-and-hold circuit 18 receives the first common timing signal on line 26. A means for time delaying 28, such as a typical delay line, is provided and delays the first common timing signal received on line 22 to produce a second timing signal on line 30. A means 32 for storing the output sample signals received on bus 24 is provided and produces corresponding output stored signals on bus 34. The storing means 32 receives the second timing signal on line 30. A means 36 for arbitrating between the output storage signals on bus 34 is provided. A means 36 for arbitrating selects one of the request signals according to a predetermined arbitration scheme and provides at least an output control signal on bus 38. The system resource 12 in the preferred embodiment receives the control signals on bus 38 and responds by providing the appropriate electronic connections to the selected requester in the multiple requesters 10. Numerous other methods are known in the prior art for connecting the appropriate requester to the system resource.

The means 36 for arbitrating further comprises output enable signals on bus 40 corresponding to the output stored signals on bus 34. The time signal generation circuit 20 receives the output enable signals from bus 40. The enable signals on bus 40 are utilized to disable an input request due to the arbitration algorithm, such as priority, round-robin, etc., until the current arbitration cycle is completed.

Also, the means 36 for arbitrating comprises a means 42 for clearing the means 32 for storing. The storing means 32 receives a clear signal from the means 42 for clearing on line 44.

The sample and hold circuit 18 samples each of the request signals before the first common timing signal causes the sample and hold circuit to hold all request signals. Each of the output sample signals received by the means 32 for storing are received before the second timing signal causes the means 32 for storing to retain the output stored signals for use by the arbitration means 36.

FIG. 2 is a more detailed block diagram of the portion of the FIG. 1 block diagram. In FIG. 2, 1 through n request lines are shown as forming the bus 16. The sample and hold circuit 18 performs a sample and hold operation on the incoming asynchronous requests from the bus 16 and stores the result in storage elements in the storage means 32. These storage elements may be D-type flip-flops 50. A feature of the present invention is that the timing parameters of the storage elements 50 are guaranteed, thereby avoiding any possible metastable conditions in the storage elements 50. At any given instant in time, the storage element 50 is guaranteed to contain stable request information. The storage element 51 provides a stored indication that a request for service has occurred and signals the start of arbitration. The time signal generation circuit 20 comprises in the preferred embodiment AND/OR gate combinations to provide a common timing signal which is generated by any incoming request provided that the arbitrator 36 is not already servicing some other request. If the priority arbitration circuitry 36 has not temporarily disabled a request, the request is allowed by enable signals on bus 40. The presence of the enable signal depends on the particular arbitration algorithm which is used. Also shown in FIG. 2 is a lock-out line 52 which connects the arbitration circuit 36 to the time signal generation circuit 20 for locking out the common timing signal. The specific circuitry used in the arbitration means 36 and in the time signal generation circuit 20 comprising the AND/OR gates is well known in the art. Also, numerous circuits are known in the art for providing the time delay for time delay circuit 28.

A tri-state gate/capacitor/schmidt-trigger gate combination performs the sample and hold operation. A tri-state gate 54, a capacitor 56, and a schmidt-trigger gate 58 are connected as shown in FIG. 2, and the combination is provided for each of the 1 through n request lines. The tri-state gates 54 receive the common timing signal on line 26. Prior to the occurrence of a request the tri-state gates 54 are in the on state. When a request occurs, the corresponding capacitor 56 is discharged to a logic zero by the corresponding tri-state gate 54, followed by the tri-state gates 54 going to a high-impedance state when the first common timing signal on line 26 occurs. The tri-state gate 54 must be able to discharge the capacitor 56 prior to being placed in a high-impedance state by the common timing signal 26. The capacitor 56 then temporarily holds the request information until the flip-flops 50 are clocked by the second timing signal on line 30. The timing signal on line 30 cannot occur until the set-up time of the D-input with respect to the clock input for the flip-flops 50 has been satisfied. Also, the second timing signal on line 30 must occur before the capacitor 56 is charged past the threshold of the schmidt-trigger gate 58, by the leakage currents of the circuit, thereby causing the D-input of the flip-flops 50 to change state.

Once the flip-flops 50 have been clocked by the second timing signal 30 and the set-up and hold timing parameters of the flip-flops 50 have been guaranteed by the relationship of the sample-and-hold circuit 18 with the timing signals, then the flip-flops 50 will provide long-term, stable request information storage.

Once stable request information is guaranteed within the flip-flops 50, then a high-speed priority arbitration circuit can be implemented in the arbitration circuit 36 with guaranteed results. The choice of the arbitration algorithm which is implemented is non-restrictive and could range from a first-in/first-out scheme to more exotic arbitration schemes.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A multi-requester arbitration circuit for arbitrating between multiple asynchronous request signals requesting a common system resource comprising:

means for providing a first common timing signal from said request signals;

means for performing sample-and-hold on each of said request signals and producing corresponding output sample signals, said sample-and-hold means receiving said first common timing signal;

means for time delaying said first common timing signal to produce a second timing signal;

means for storing said output sample signals and producing corresponding output stored signals, said storing means receiving said second timing signal; and means for arbitrating between said output stored signals to select one of said output stored signals and provide at least an output control signal having output enable signals corresponding to said output stored signals, and wherein said means for providing a first common timing signal receives said output enable signals, said means for arbitrating providing n number of output enable signals corresponding to an n number of request signals.

2. The circuit described in claim 1 wherein said arbitrating means further comprises output enable signals corresponding to said output stored signals, and wherein said means for providing a first common timing signal receives said output enable signals.

3. The circuit described in claim 1 wherein said arbitrating means further comprises means for clearing said storing means, said storing means receiving a clear signal from said means for clearing in said arbitrating means.

4. The circuit described in claim 1 wherein said sample-and-hold means samples each of said request signals before said first common timing signal causes said sample-and-hold means to hold all request signals.

5. The circuit described in claim 1 wherein each of said output sample signals is received by said means for storing before said second timing signal causes said means for storing to retain said output stored signals for use by said arbitrating means.

6. The circuit described in claim 1 wherein said means for performing sample-and-hold comprises:

at least a tri-state gate having a first input for receiving the request signal and a second input for receiving the first common timing signal and having an output;

a capacitor connected between the output of said tri-state gate and ground; and a schmidt-trigger gate having an input connected to the output of the tri-state gate and having an output for producing the output sample signal.

7. The circuit described in claim 1 wherein said means for storing comprises a plurality of D-type flip-flops having the D input receiving an output sample signal and having a clock input receiving the second timing signal and having an output for producing the output stored signal.

* * * * *